United States Patent
Sundar et al.

(10) Patent No.: US 12,278,818 B2
(45) Date of Patent: Apr. 15, 2025

(54) RESOURCE AUTHORIZATION

(71) Applicant: Telefonaktiebolaget LM Ericsson (publ), Stockholm (SE)

(72) Inventors: Divya Sundar, Chennai (IN); Savitha Aravindhan, Chennai (IN); Vadivel G, Chennai (IN); Karthick Munirathinam, Chennai (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 150 days.

(21) Appl. No.: 17/784,660

(22) PCT Filed: Dec. 19, 2019

(86) PCT No.: PCT/IN2019/050937
§ 371 (c)(1),
(2) Date: Jun. 12, 2022

(87) PCT Pub. No.: WO2021/124342
PCT Pub. Date: Jun. 24, 2021

(65) Prior Publication Data
US 2023/0019281 A1    Jan. 19, 2023

(51) Int. Cl.
*H04L 9/40* (2022.01)
(52) U.S. Cl.
CPC ........ *H04L 63/104* (2013.01); *H04L 63/0853* (2013.01)
(58) Field of Classification Search
CPC ....... H04L 63/08; H04L 63/10; H04L 63/104; H04L 63/0853; H04L 63/0807;
(Continued)

(56) References Cited

U.S. PATENT DOCUMENTS 8,402,514 B1 *  3/2013  Thompson .............. H04L 63/08
                                                      726/4
9,218,502 B1 * 12/2015  Doermann ............ G06F 21/604
(Continued)

OTHER PUBLICATIONS

Extended European Search Report, European Patent Application No. 19956764.5, mailed Aug. 2, 2023, 4 pages.
(Continued)

*Primary Examiner* — James N Fiorillo
(74) *Attorney, Agent, or Firm* — Sage Patent Group

(57) ABSTRACT

A method is disclosed for authorization of resources clustered into one or more resource groups, each resource group comprising functionally interdependent resources.
The method includes receiving an authorization request signal indicative of a first resource for authorization, wherein the first resource is comprised in a first resource group, determining—for each mandatory resource of the first resource group—whether the resource is authorized, and transmitting an authorization response signal. The authorization response signal is indicative of successful authorization of the first resource when all mandatory resources of the first group are determined as authorized. Further, the authorization response signal is indicative of unsuccessful authorization of the first resource when at least one mandatory resource of the first group is determined as unauthorized.
Corresponding apparatus, authorization server, network node and computer program product are also disclosed.

11 Claims, 5 Drawing Sheets

(58) Field of Classification Search
CPC . H04L 9/32; H04L 9/40; H04L 9/3213; H04L 9/3234; H04L 67/104; H04L 67/1044; H04L 12/185; G06F 11/1425; G06F 21/6218; H04W 12/06; H04W 4/005
USPC .......................................................... 726/4
See application file for complete search history.

(56) References Cited

U.S. PATENT DOCUMENTS

| | | | | |
|---|---|---|---|---|
| 9,246,986 | B1* | 1/2016 | Ward, Jr. | H04W 4/70 |
| 10,291,616 | B1* | 5/2019 | Streete | H04L 63/10 |
| 2002/0169986 | A1* | 11/2002 | Lortz | H04L 63/08 |
| | | | | 726/4 |
| 2004/0199794 | A1* | 10/2004 | Philips | G06F 21/41 |
| | | | | 726/8 |
| 2005/0132054 | A1 | 6/2005 | Chang et al. | |
| 2009/0178107 | A1* | 7/2009 | Karjoth | G06F 16/24564 |
| | | | | 707/999.102 |
| 2011/0010758 | A1* | 1/2011 | Faitelson | H04L 9/32 |
| | | | | 726/4 |
| 2011/0167479 | A1* | 7/2011 | Maes | H04L 9/3213 |
| | | | | 726/4 |
| 2012/0150912 | A1* | 6/2012 | Ripberger | G06F 16/24573 |
| | | | | 707/786 |
| 2012/0167158 | A1* | 6/2012 | Leach | G06F 21/604 |
| | | | | 726/21 |
| 2014/0090027 | A1* | 3/2014 | Tamura | G06F 21/41 |
| | | | | 726/4 |
| 2015/0038115 | A1* | 2/2015 | Kim | H04W 12/084 |
| | | | | 455/411 |
| 2015/0350904 | A1* | 12/2015 | Kim | H04L 63/102 |
| | | | | 455/411 |
| 2015/0358824 | A1* | 12/2015 | Kim | H04L 63/101 |
| | | | | 726/4 |
| 2016/0302069 | A1* | 10/2016 | Kim | H04W 4/70 |
| 2018/0316676 | A1* | 11/2018 | Gilpin | H04L 9/0891 |
| 2019/0379672 | A1* | 12/2019 | Hashmi | G06F 9/45512 |
| 2021/0075794 | A1* | 3/2021 | Gazit | H04L 63/1408 |
| 2021/0084521 | A1* | 3/2021 | Na | H04W 28/0215 |

OTHER PUBLICATIONS

Article 94(3) EPC Communication, European Patent Application No. 19956764.5, mailed Aug. 14, 2023, 4 pages.
International Search Report and Written Opinion of the International Searching Authority, PCT/IN2019/050937, mailed Jun. 9, 2020, 11 pages.
European Intention To Grant, European Patent Application No. 19956764.5, mailed Feb. 21, 2025, 8 pages.

* cited by examiner

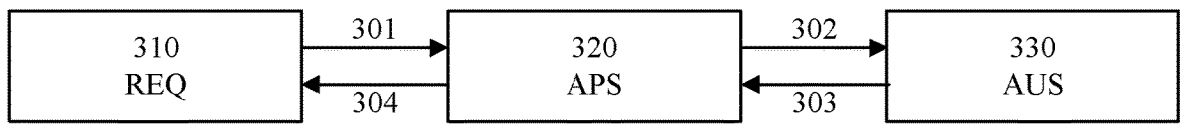
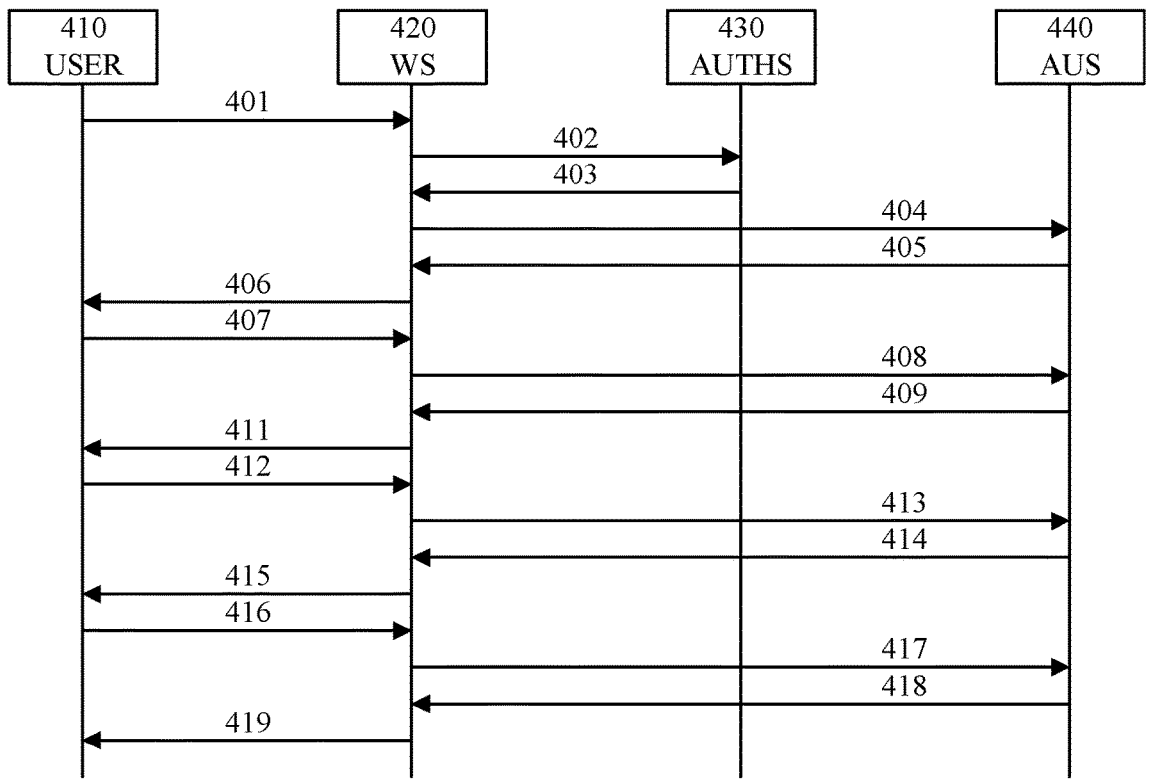
FIG. 3
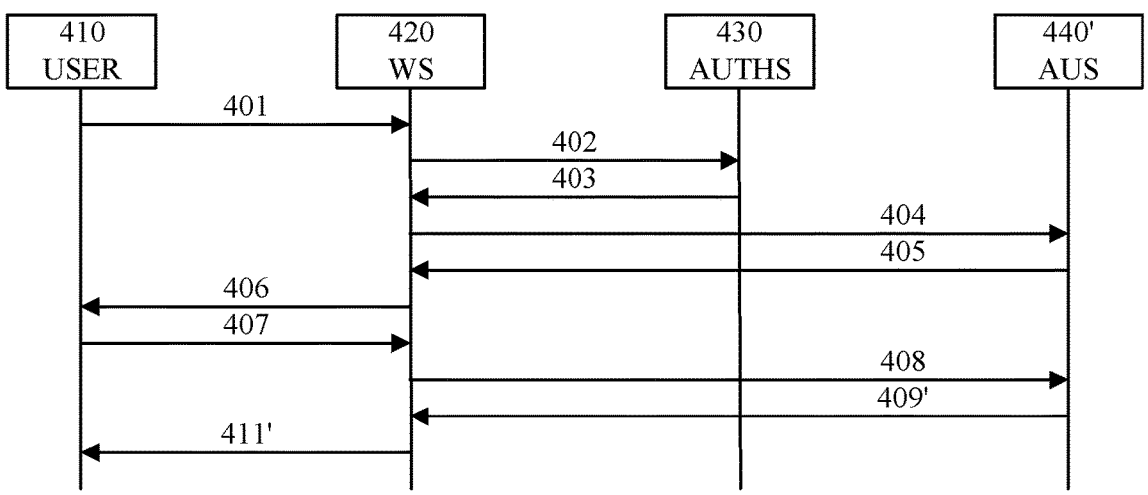
FIG. 4A
FIG. 4B

RESOURCE AUTHORIZATION

TECHNICAL FIELD

The present disclosure relates to the field of authorization of resources by an authorization server.

BACKGROUND

Some standard authorization protocols, such as Open Authorization Standard (OAuth) 2.0, allow granting of access for users to resources without exposing of resource credentials. The following roles may be identified in relation to a typical OAuth 2.0 flow: end user, application server, and authorization server (e.g., associated with, comprising, or comprised in, an authentication and authorization—AA—system).

In a typical scenario, the end user attempts to access (e.g., by issuing a user request) a resource (e.g., an application). The access attempt may involve stating a user identity or similar (e.g., one or more of a user name, a password, an authentication certificate an authentication key, etc.).

The application server typically intercepts the user request and sends it to the authorization server. The authorization server determines whether the user request is authorized (e.g., by authentication of the end user in relation to the requested resource).

If the user request is determined as authorized, the authorization server typically issues an access grant (e.g., comprising an access token) and sends it to the application server, which responds back to the end user accordingly.

The authorization of resources typically causes a time duration between transmitted request and received response to be experienced by the end user.

Furthermore, the authorization of resources typically causes processing and/or signaling load for the application server, and/or the authorization server, and/or the interface between application server and authorization server.

Therefore, there is a need for alternative approaches to authorization of resources. Preferably, such approaches improve functionality as experienced by the end user. Also preferably, such approaches improve (e.g., decrease) processing and/or signaling load for the application server, and/or the authorization server, and/or the interface between application server and authorization server.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for authorization of resources clustered into one or more resource groups, each resource group comprising functionally interdependent resources.

The method comprises receiving an authorization request signal indicative of a first resource for authorization, wherein the first resource is comprised in a first resource group, determining—for each mandatory resource of the first resource group—whether the resource is authorized, and transmitting an authorization response signal.

The authorization response signal is indicative of successful authorization of the first resource when all mandatory resources of the first group are determined as authorized.

The authorization response signal is indicative of unsuccessful authorization of the first resource when at least one mandatory resource of the first group is determined as unauthorized.

In some embodiments, the method is a computer-implemented method.

In some embodiments, the method is for an authorization server.

In some embodiments, the first resource group comprises a plurality of hierarchically organized resources, wherein the first resource is a parent resource and the other resources of the first resource group are child resources, the child resources being functionally dependent on the parent resource.

In some embodiments, the authorization request signal is further indicative of a requester of the first resource, and determining whether each mandatory resource is authorized comprises determining whether each mandatory resource is authorized for the requester.

In some embodiments, the authorization response signal is further indicative of which resources of the first resource group are determined as authorized.

In some embodiments, the authorization response signal comprises an authorization token (e.g., an access token).

In some embodiments, the method further comprises clustering the resources for authorization into the one or more resource groups.

In some embodiments, the method further comprises storing a mapping between resources for authorization, wherein the mapping is in accordance with the clustering.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for authorization of resources clustered into one or more resource groups, each resource group comprising functionally interdependent resources.

The apparatus comprises controlling circuitry configured to cause reception of an authorization request signal indicative of a first resource for authorization, wherein the first resource is comprised in a first resource group, determination—for each mandatory resource of the first resource group—of whether the resource is authorized, and transmission of an authorization response signal.

The authorization response signal is indicative of successful authorization of the first resource when all mandatory resources of the first group are determined as authorized.

The authorization response signal is indicative of unsuccessful authorization of the first resource when at least one mandatory resource of the first group is determined as unauthorized.

A fourth aspect is an authorization server comprising the apparatus of the third aspect.

A fifth aspect is a network node of a wireless communication network, wherein the network node comprises the authorization server of the fourth aspect and/or the apparatus of the third aspect.

In some embodiments, any of the above aspects may additionally have features identical with or corresponding to any of the various features as explained above for any of the other aspects.

A first advantage of some embodiments is that alternative approaches to authorization of resources are provided. In some embodiments, the alternative approaches to authorization of resources may comprise improvement (e.g., enhancement) of existing approaches to authorization of resources.

A second advantage of some embodiments is that the functionality as experienced by the end user is improved.

A third advantage of some embodiments is that processing and/or signaling load for the application server, and/or the authorization server, and/or the interface between application server and authorization server is improved (e.g., decreased). This may in turn lead to improved (e.g., decreased) network utilization and/or improved performance of the application server.

A fourth advantage of some embodiments is that rendering of applications which are not fully functional due to that one or more resources are un-authorized is avoided; which typically improves the user experience.

Generally, when the term user (or end user) is used herein, it is meant to encompass not only a scenario with human interaction, but also a scenario with an autonomous device acting as requester. Thus, the term user (or end user) is generally replaceable by the term requester.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 3 is a schematic block diagram illustrating an example system according to some embodiments;

FIGS. 4A-D are signaling diagrams illustrating example signaling according to some embodiments;

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where alternative approaches to authorization of resources are provided.

Generally, resources may be specified according to any suitable definition (e.g., a definition known in the art of authorization). For example, a resource may be defined in association with a service, functionality, application, or hardware module that a user is attempting to access. A resource may be one or more services, one or more functionalities, one or more applications, one or more computer files, one or more data items, one or more computer programs, one or more computing devices, one or more functionality provided by computer applications, one or more services, one or more hardware modules, etc. Also generally, the resources are typically accommodated by one or more nodes. A resource may be accommodated by a single node, or may be distributedly accommodated (e.g., a cloud resource). Similarly, two or more resources may be co-located, or may be distributedly located (e.g., within a cloud).

Authorization of a resource may, for example, be based on whether one or more conditions are fulfilled for gaining access to a service, functionality, or application. Example conditions include that the user is registered for the service, functionality, or application, that the user has performed an action in relation to the service, functionality, or application, etc.

Figure 1:
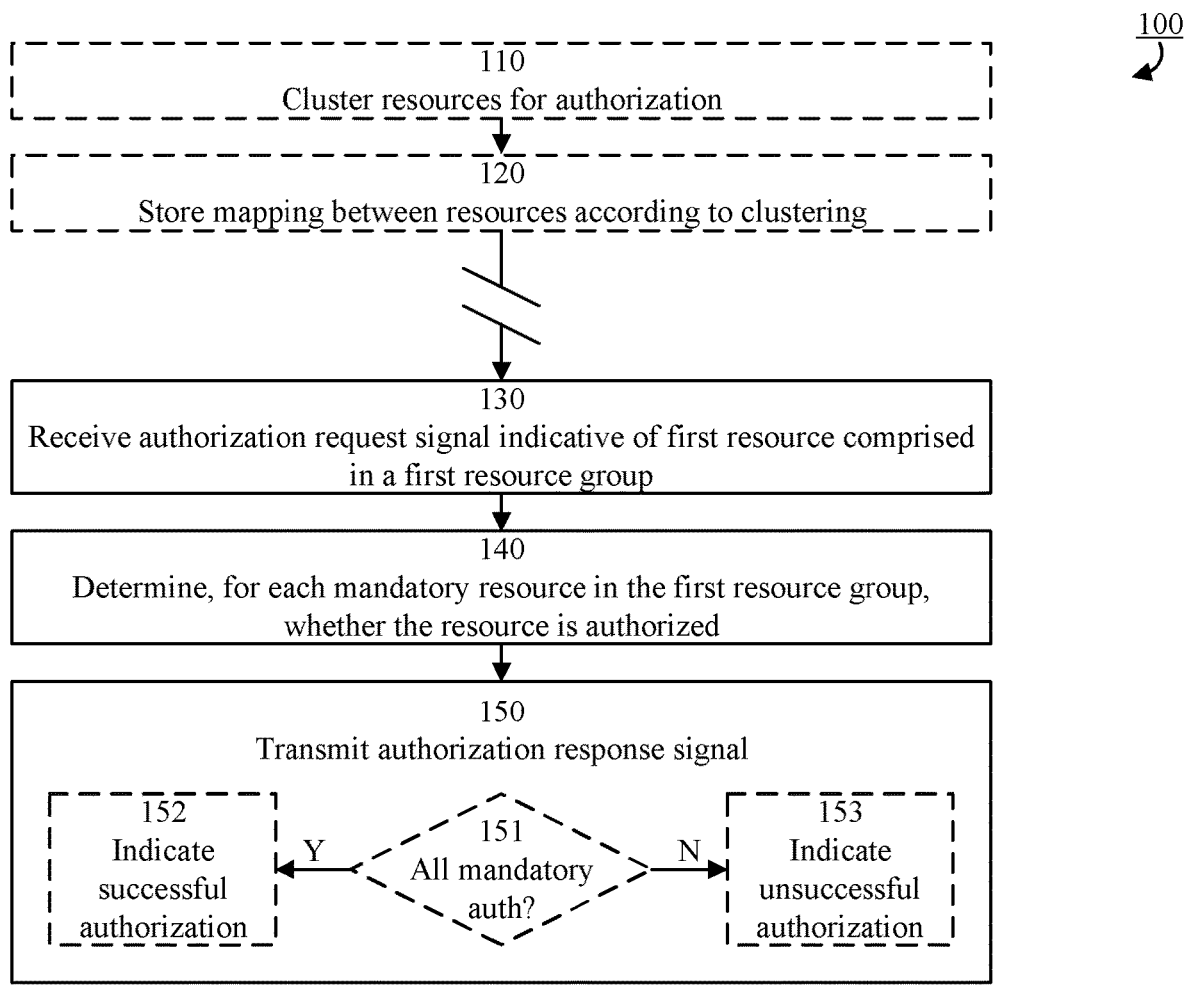
FIG. 1 is a flowchart illustrating example method steps according to some embodiments.

FIG. 1 illustrates an example method 100 according to some embodiments. The method is a computer-implemented method for authorization of resources clustered into one or more resource groups. For example, the method may be for an authorization server; e.g., implemented/performed by an authorization server.

The resource groups may be non-overlapping (i.e., each resource is comprised in only one resource group) or overlapping (i.e., each of one or more resources are comprised in more than one resource group).

The resource groups are defined such that each resource group comprises functionally interdependent (e.g., intradependent) resources. For example, two resources may belong to the same group when execution of a service, functionality, or application associated with one of the two resources is conditioned on authorization of the other one of the two resources.

Generally, resources may be mandatory or optional. Typically, authorization of a mandatory resource is necessary for execution of an overall service, functionality, or application associated with the group; while authorization of an optional resource is not necessary for execution of an overall service, functionality, or application associated with the group.

A resource group may comprise only mandatory resources or may comprise a combination of mandatory and optional resources. Typically, a resource group comprises at least one mandatory resource. In some examples, a resource group comprises at least two mandatory resources.

A resource group may comprise (e.g., consist of) a plurality of hierarchically organized resources, wherein one resource is a parent resource and the other resources of the resource group are child resources. The parent resource is typically mandatory.

Typically, the child resources are functionally dependent on the parent resource (e.g., execution of a service, functionality, or application associated with the child resource is conditioned on authorization of the parent resource). Alternatively or additionally, the parent resource may be functionally dependent on one or more of the child resources (e.g., execution of a service, functionality, or application associated with the parent resource is conditioned on authorization of the one or more child resources).

Figure 2A:
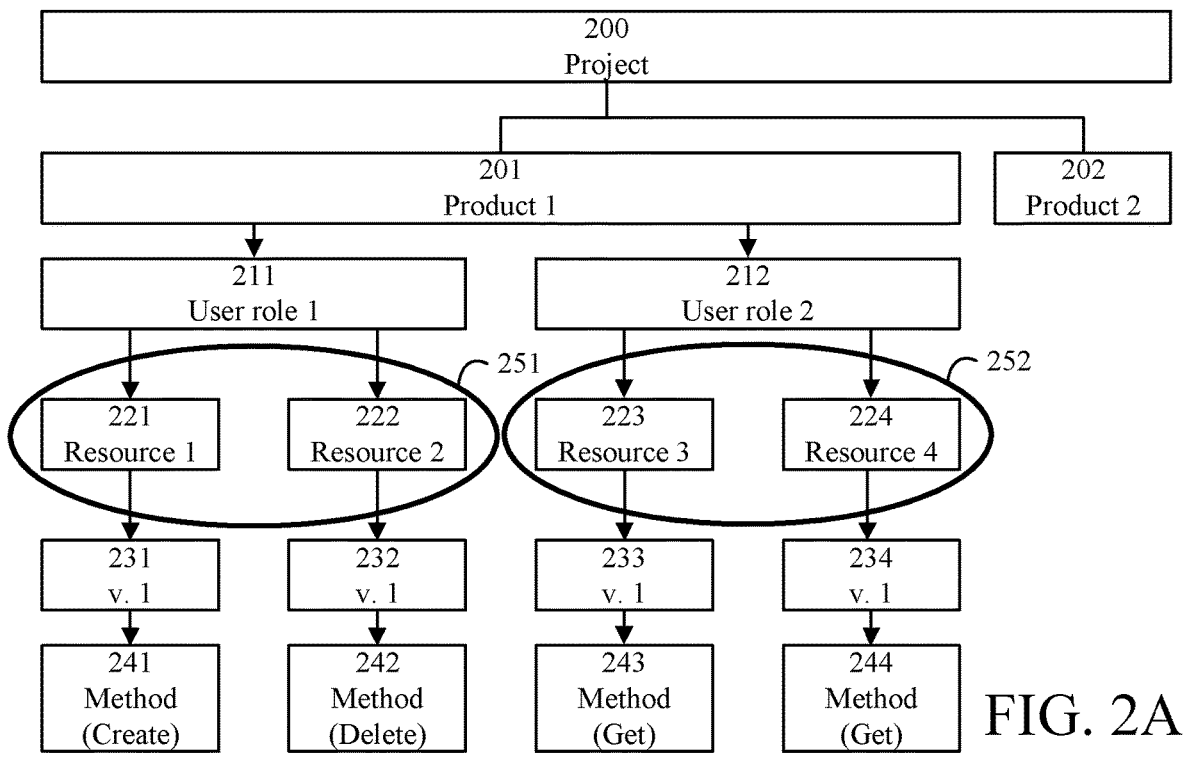
FIGS. 2A and 2B are schematic diagrams illustrating example arrangements of resources according to some embodiments.
Figure 2B:
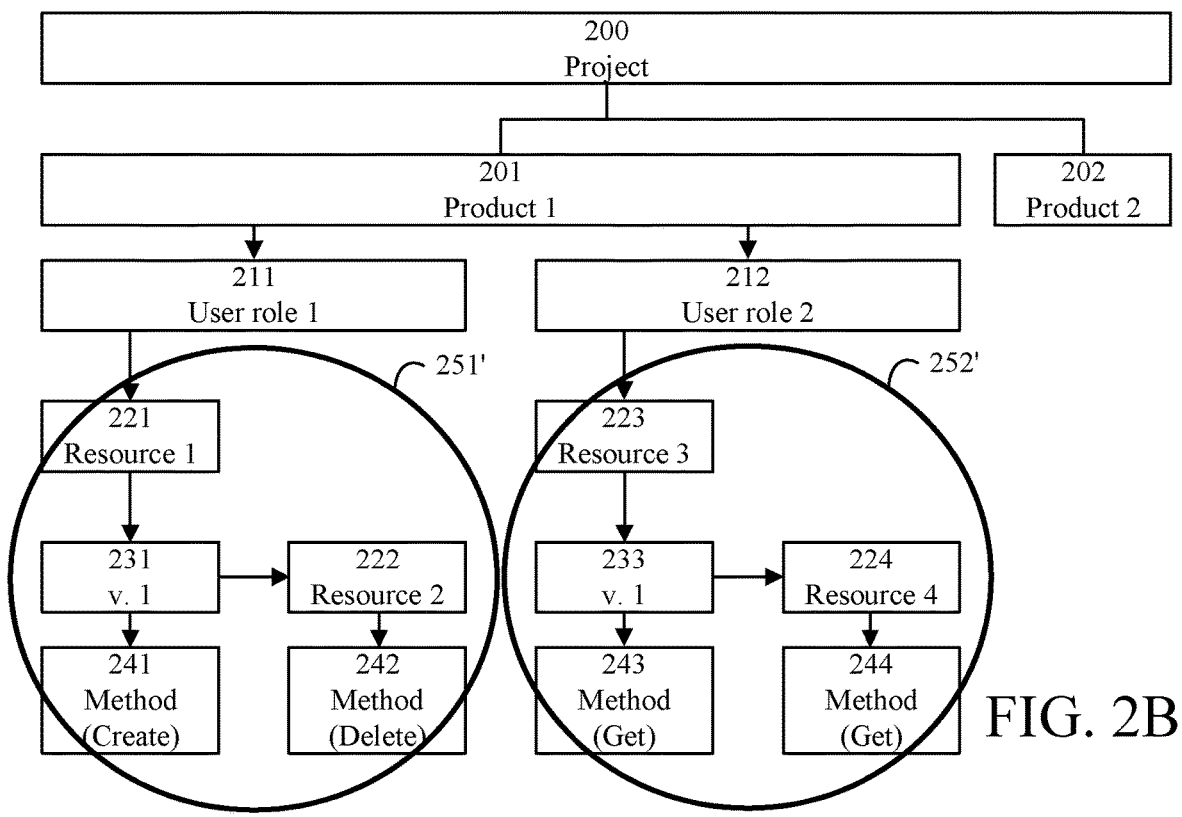

Resource groups with hierarchically organized resources will be further exemplified in connection to FIG. 2B.

Alternatively, a resource group may be a cluster of functionally interdependent resources without any hierarchy between them.

In step 130, an authorization request signal (e.g., caused by an end user attempting to access a resource) is received. The authorization request signal is indicative of a first resource for authorization (e.g., a resource that an end user attempts to access). Due to the clustering of resources into one or more resource groups, the first resource is inherently comprised in a first resource group. For example, the first resource may be a parent resource of the first resource group.

In step 140, it is determined, for each mandatory resource of the first resource group, whether the resource is authorized, and in step 150, an authorization response signal is transmitted accordingly.

As illustrated by sub-step 152, the authorization response signal may be indicative of successful authorization of the first resource when all mandatory resources of the first group are determined as authorized (Y-path out of sub-step 151).

As illustrated by sub-step 153, the authorization response signal may be indicative of unsuccessful authorization of the first resource when at least one mandatory resource of the first group is determined as unauthorized (N-path out of sub-step 151).

Thus, authorization for all mandatory resources of the group is performed in response to a single authorization request signal, and a single authorization response signal is transmitted to indicate authorization of all mandatory resources of the group. This is contrary to typical approaches of the prior art, wherein each authorization of a resource requires a dedicated authorization request signal for that particular resource, and generates a corresponding dedicated authorization response signal for that particular resource only.

When all mandatory resources of the group are determined as authorized, the method has the advantage of less signaling and/or processing for authorization, which may, in turn, have the advantage of more efficient authorization.

When at least one mandatory resource of the group is determined as unauthorized, the method may have the advantage of less signaling and/or processing for authorization, and has the further advantage of not unnecessarily initiating (e.g., at the end user side) a service, functionality, or application associated with the first resource—only to later discover that the service, functionality, or application will not be fully executed since an interdependent resource is unauthorized.

In some embodiments, step 140 further comprises determining, for one or more optional resources of the first resource group, whether the resource is authorized, and the authorization response signal transmitted in step 150 may be adjusted accordingly.

For example, the authorization response signal may be indicative of successful authorization of the first resource when all mandatory resources, and the one or more optional resources, of the first group are determined as authorized, and may be indicative of unsuccessful authorization of the first resource when at least one mandatory resource, or at least one of the one or more optional resources, of the first group is determined as unauthorized.

In some embodiments, the authorization response signal is further indicative of which resources of the first resource group are determined as authorized. This may be applicable when the authorization response signal is indicative of successful authorization and/or when the authorization response signal is indicative of unsuccessful authorization.

An advantage with explicitly informing the application server of which resources are authorized is that the application server can explicitly conclude that no further authorization request signals need to be sent for authorization of such resources.

Another advantage with explicitly informing the application server of which resources are authorized is that the application server can determine to discard a service, functionality, or application associated with an unauthorized optional resource.

In some embodiments, the authorization request signal of step 130 is indicative of a requester of the first resource (e.g., by comprising a requester identity). Then, determining whether each mandatory resource is authorized in step 140 may comprise determining whether each mandatory resource is authorized for the requester.

In some embodiments, the authorization response signal comprises an authorization token, such as an access token. An example is an access token for application programming interface (API) authorization scenarios; for example, in JSON Web Token (JWT) format. A token, such as JWT, may comprise three parts: a header, a payload, and a signature. The header may comprise metadata about the type of token and the cryptographic algorithms used to secure its contents. The payload may comprise a set of statements ("claims") about the permissions that should be allowed, and other information like the intended audience and the expiration time. The signature may be used to validate that the token is trustworthy and has not been tampered with.

To perform step 140, the authorization server uses knowledge regarding the resource groups (e.g., a mapping between resources indicating, for example, interdependencies and/or group membership).

As illustrated by optional steps 110 and 120, the method 100 may also comprise clustering the resources for authorization into the one or more resource groups and/or storing a mapping between resources for authorization (wherein the mapping is in accordance with the clustering).

The clustering may be static or dynamic. For example, the clustering may vary over time based on issuance of new versions of the resources. As such, the clustering of the authorization server may represent an internal state of the node(s) accommodating the resource(s), wherein each internal state is defined, e.g., by a specific version for each resource, or by any other varying attribute of a resource.

In some embodiments, the clustering is performed elsewhere and step 110 may be replaced by acquiring (e.g., receiving) clustering information (e.g., the mapping).

FIGS. 2A and 2B schematically illustrate example arrangements of resources according to some embodiments.

The arrangements are illustrated in the context of a project 200 to which at least two products (product 1 and product 2) 201 and 202 belongs. For product 1, two user roles are defined (user role 1 and user role 2) 211 and 212.

FIG. 2A illustrates a situation where execution of user role 1 requires a separate request for resource 1, first version (v. 1), method (create) as illustrated by 221, 231, 241 and a separate request for resource 2, first version (v. 1), method (delete) as illustrated by 222, 232, 242; and execution of user role 2 requires a separate request for resource 3, first version (v. 1), method (get) as illustrated by 223, 233, 243 and a separate request for resource 4, first version (v. 1), method (get) as illustrated by 224, 234, 244.

However, if resources 1 and 2 are functionally interdependent they may be clustered in a first resource group 251, and if resources 3 and 4 are functionally interdependent they may be clustered in a second resource group 252. The type of resource clustering illustrated by 251 and 252 is one where a resource group comprises functionally interdependent resources without any hierarchy between them.

When user 1 requests resource 2 and an authorization request signal indicative of resource 2 is receiver by the authorization server, the authorization server determines whether both resource 1 and resource 2 are authorized in response to receiving the authorization request signal indicative of resource 2. Similarly, when user 1 requests resource 1 and an authorization request signal indicative of resource 1 is receiver by the authorization server, the authorization server determines whether both resource 1 and resource 2 are authorized in response to receiving the authorization request signal indicative of resource 1.

FIG. 2B also illustrates a situation where functionally interdependent resources 1 and 2 are clustered in a first resource group 251', and functionally interdependent resources 3 and 4 are clustered in a second resource group 252'. The type of resource clustering illustrated by 251' and 252' is one where a resource group comprises a plurality of hierarchically organized resources. In the resource group 251', resource 1 is a parent resource and resource 2 is a child resource. In the resource group 252', resource 3 is a parent resource and resource 4 is a child resource.

When user 1 requests resource 1 and an authorization request signal indicative of resource 1 is receiver by the authorization server, the authorization server determines whether both resource 1 and all its child resources (only resource 2 in this case) are authorized in response to receiving the authorization request signal indicative of resource 1.

For example, when the user "Ted", belonging to user role 2, requests access for resource 3 in a request sent to the application server, the application server may query the authorization server as follows:

```
        User Ted - User Role: System Engineer
        Request:
        {
           "Resource name": "Resource 3",
           "Method": "GET",
           "Version": "v1"
        }
```

A separate request for access to resource 4, GET, v1 is not needed. The authorization server autonomously checks the hierarchy, traverses the leaf (resource 4) based on the parent (resource 3), checks all resources in the hierarchy, consolidates the information, and provides it to application server, e.g., in the following format:

```
{
   "User": " Ted",
   "User Role": "System Engineer",
   "Accessed Resource":
   {
      "Resource name": "Resource 3",
      "Method": "GET",
      "Version": "v1"
   },
   "Dependent Resources":
   [
      {
         "Resource name": "Resource 4",
         "Method": "GET",
         "Version": "v1"
      }
   ]
}
```

One example application is when an end user attempts to access a secure hardware environment of an application server to perform secure processing (e.g., encryption or decryption) and/or acquire a security attribute (e.g., an encryption key or a decryption key). Then, instead of first authorizing access to the secure hardware in response to a first authorization request signal, and subsequently authorizing acquisition of the security attribute and/or performance of the secure processing in response to one or more subsequent authorization request signals; some embodiments enable authorization of access to the secure hardware, as well as acquisition of the security attribute and/or performance of the secure processing in response to only one authorization request signal.

FIG. 3 schematically illustrates an example system according to some embodiments. The system is for authorization of resources clustered into one or more resource groups, each resource group comprising functionally interdependent resources. For example, the system may be for authenticating a requester (e.g., an end user) and authorizing resources requested by the requester.

The system comprises a requester (REQ) 310, an application server (APS) 320 and an authorization server (AUS) 330.

A request 301 from the requester 310 reaches the application server 320, and the application server 320 sends a corresponding request 302 to the authorization server 330 for authorizing the resources needed to accommodate the request 301.

The authorization server 330 determines whether the needed resources are authorized. For example, the authorization server (AUS) 330 may be configured to cause execution (e.g., to execute) one or more steps of the method 100 of FIG. 1. In some embodiments, the authorization server 330 may determine that the needed resources are authorized by authenticating the requester in relation to the resources.

The authorization server 330 sends a response 303 is to the application server 320, and the application server sends a corresponding response 304 to the requester 310.

FIGS. 4A-D illustrate example signaling according to some embodiments.

FIGS. 4A-B illustrate example signaling between a user 410 (e.g., a client), a web server (WS) 410 (which may be an example of an application server), an authentication server (AUTHS) 430, and an authorization server (AUS) 440, 440'. FIG. 4A illustrates a scenario according to the prior art and FIG. 4B illustrates a scenario according to some embodiments.

It can be seen that the number of signals between WS and AUS, as well as between USER and WS is higher in FIG. 4A than in FIG. 4B.

In an example with a prepaid recharge system, the user may start with a login request 401 (e.g., by clicking a login icon rendered on a user interface), which the WS forwards 402 to the AUTHS. The AUTHS responds with an access token 403, and the WS follows up with an authorization request 404 to the AUS, which responds with an authorization acknowledgement and a JWT 405. Details of the user identity may be added as "claims" in the token. The WS sends the token 406 to the user, indicating successful login (e.g., rendering a corresponding message on the user interface). Further request(s) 407, 412, 416 are sent with the token in header and authorization is done based on the user details of the token; matching it to the resource that the user wishes to access.

Separate resources are requested in each request 407, 412, 416 according to FIG. 4A, while a single request 407 authorizes several resources according to FIG. 4B.

In FIG. 4A, the request 407 may correspond to clicking a recharge icon rendered on the user interface, 408 may correspond to a query whether the user is authorized to access a recharge functionality, 409 may correspond to a response that the user is authorized, and 411 may correspond to rendering a recharge link with a prepaid recharge icon on the user interface.

In FIG. 4A, the request 412 may correspond to clicking the prepaid recharge icon rendered on the user interface, 413 may correspond to a query whether the user is authorized to access a prepaid recharge functionality, 414 may correspond to a response that the user is authorized, and 415 may correspond to rendering a prepaid recharge link with a validity extension icon on the user interface.

In FIG. 4A, the request 416 may correspond to clicking the validity extension icon rendered on the user interface, 417 may correspond to a query whether the user is authorized to extend validity, 418 may correspond to a response that the user is unauthorized, and 419 may correspond to rendering a message that the user is unauthorized on the user interface.

Thus, in this example the prepaid recharge resource "/prepaidrecharge" for the version v1 is authorized as illustrated by 414 and 415, but the child dependency for the validity extension period "/extensionperiod" is not authorized for v1 as illustrated by 418 and 419. Thus, the user is in fact not authorized to do prepaid recharge, but the prepaid recharge link on the user interface is rendered anyway and the function blocking is evident to the user only after clicking the validity extension icon.

In FIG. 4B, the "/prepaidrechage" would be defied as a parent resource and would be grouped together with "/extensionperiod" defined as a child resource.

Then, the request 407 may correspond to clicking a recharge icon rendered on the user interface, 408 may correspond to a query whether the user is authorized to access a recharge functionality, 409' may correspond to a response that the user is unauthorized (since one of the child resources is unauthorized), and 411' may correspond to rendering a message that the user is unauthorized on the user interface.

Thus, in FIG. 4B, the prepaid recharge link is rendered on the user interface only if all relevant resources are authorized. Furthermore, the authorization is accomplished with one single call to the authorization server.

Figure 4C:
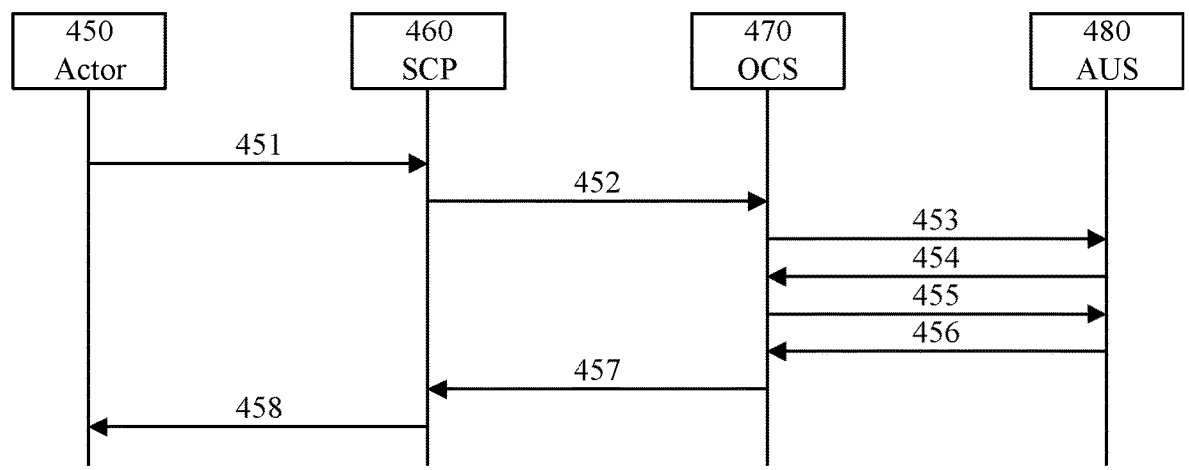
Figure 4D:
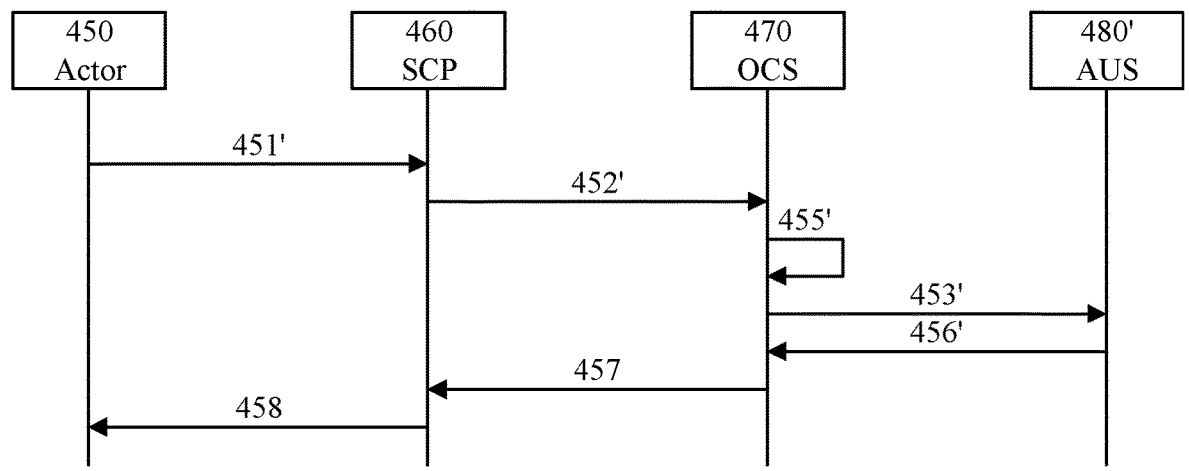

FIGS. 4C-D illustrate example signaling in a business support system (BSS) system between an actor 450, a self-care portal (SCP) 460 (which may be an example of an application server), an online charging system (OCS) 470, and an authorization server (AUS) 480, 480'. FIG. 4C illustrates a scenario according to the prior art and FIG. 4D illustrates a scenario according to some embodiments.

In an example with a prepaid recharge system, the user may start with a login request (e.g., by clicking a login icon rendered on a user interface).

In FIG. 4C, the login request may be separate from a refill request 451 (e.g., triggered by clicking a refill link rendered on the user interface in response to successful login). The refill request is forwarded to the OCS, which requests resource authorization for refill as illustrated by 453. If access for refill is granted as illustrated by 454, the OCS sends a request for resource authorization for validity extension as illustrated by 455. If validity extension is unauthorized, a rejection 456 may be sent to the OCS, and the information that refill is unsuccessful is provided to the SCP and the actor as illustrated by 457 and 458, respectively.

Thus, the actor is in fact not authorized to do refill, but the refill link on the user interface is rendered anyway and the function blocking is evident to the actor only later.

Furthermore, separate signaling is needed for login, authorization for refill, and authorization for validity extension.

In FIG. 4D, the login request may implicitly include a refill request 451' (before any refill link is rendered on the user interface). The login request is forwarded to the OCS with the side order of getting a list of authorized functionalities 452'. The OCS analyses if the actor has access to refill request as illustrated by 455', and if so the OCS sends a request for resource authorization for refill as illustrated by 453'.

The authorization server checks authorization for refill and at least all mandatory child resources in the group hierarchy of the refill, including validity extension. If any of the checked mandatory resources (e.g., validity extension) is unauthorized, a refill rejection 456' may be sent to the OCS, and the information that refill is unsuccessful is provided to the SCP and the actor as illustrated by 457 and 458, respectively.

Thus, the refill link is never rendered on the user interface since the actor is not authorized to do refill. Furthermore, the signaling related to login, authorization for refill, and authorization for validity extension is condensed compared to FIG. 4C.

Figure 5:
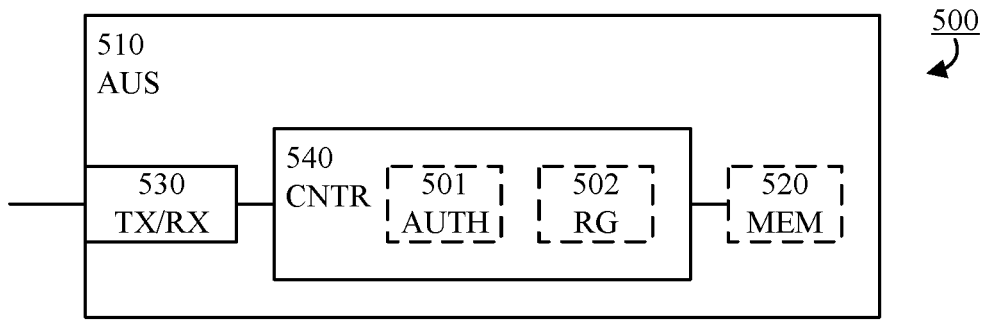
FIG. 5 is a schematic block diagram illustrating an example apparatus according to some embodiments.

FIG. 5 schematically illustrates an example apparatus 500 according to some embodiments. The apparatus 500 is for authorization of resources clustered into one or more resource groups, each resource group comprising functionally interdependent resources. For example, the apparatus 500 may be configured to cause execution of (e.g., to execute) one or more steps of the method 100 of FIG. 1 and/or one or more of the signal transmissions and/or receptions of FIG. 4A-D.

In some embodiments, the apparatus 500 may be for an authorization server (AUS) 510; e.g., the apparatus may be comprisable, or comprised, in the authorization server 510 as illustrated in FIG. 5. The authorization server 510 may, for example, be one or more of the authorization servers 330, 440' and 480'. In some embodiments, the apparatus 500 may be comprisable, or comprised, in a network node.

The apparatus 500 comprises a controller (CNTR; e.g., controlling circuitry or a control module) 540.

The controller 540 is configured to cause reception of an authorization request signal indicative of a first resource for authorization, wherein the first resource is comprised in a first resource group (compare with step 130 of FIG. 1).

To this end, the controller may comprise or be otherwise associated with (e.g., connectable, or connected, to) a receiver (e.g., reception circuitry or a reception module), illustrated in FIG. 5 as part of a transceiver (TX/RX) 530. The receiver may be configured to receive the authorization request signal.

The controller is also configured to cause determination—for each mandatory resource of the first resource group—of whether the resource is authorized (compare with step 140 of FIG. 1).

To this end, the controller may comprise or be otherwise associated with (e.g., connectable, or connected, to) an authorizer (AUTH; e.g., authorizing circuitry or an authorizing module) 501. The authorizer may be configured to determine—for each mandatory resource of the first resource group—whether the resource is authorized.

The controller is also configured to cause transmission of an authorization response signal, wherein the authorization response signal is indicative of successful authorization of the first resource when all mandatory resources of the first group are determined as authorized, and wherein the authorization response signal is indicative of unsuccessful authorization of the first resource when at least one mandatory resource of the first group is determined as unauthorized (compare with step 150 of FIG. 1).

To this end, the controller may be associated with (e.g., connectable, or connected, to) a transmitter (e.g., transmission circuitry or a transmission module), illustrated in FIG. 5 as part of the transceiver (TX/RX) 530. The transmitter may be configured to transmit the authorization response signal.

In some embodiments, the controller is also configured to cause clustering of the resources for authorization into the one or more resource groups (compare with step 110 of FIG. 1).

To this end, the controller may comprise or be otherwise associated with (e.g., connectable, or connected, to) a resource grouper (RG; e.g., resource grouping circuitry or a resource grouping module) 502. The resource grouper may be configured to cluster the resources for authorization into the one or more resource groups.

In some embodiments, the controller is instead configured to cause acquisition (e.g., reception via the receiver) of clustering information (e.g., a mapping between resources for authorization).

In either case, the controller may, according to some embodiments, be configured to cause storing of a mapping between resources for authorization, wherein the mapping is in accordance with the clustering (compare with step 120 of FIG. 1).

To this end, the controller may comprise or be otherwise associated with (e.g., connectable, or connected, to) a memory (MEM; e.g., memory circuitry or a memory module) 520. The memory may be configured to store the mapping between resources for authorization.

Figure 6:
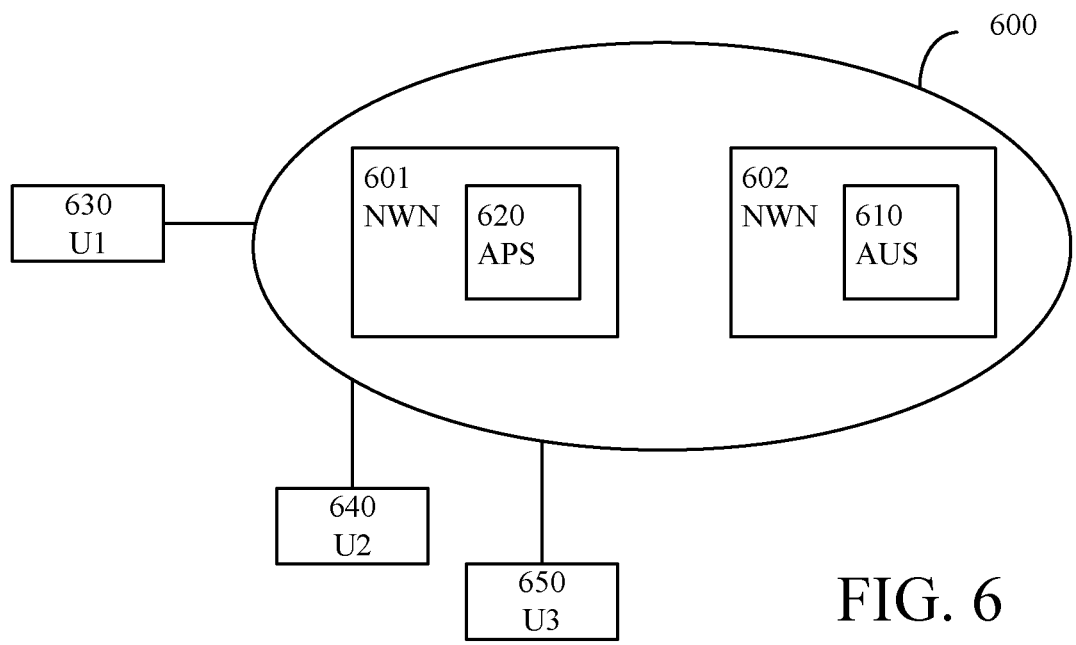
FIG. 6 is a schematic block diagram illustrating an example system according to some embodiments.

FIG. 6 schematically illustrates an example system 600 according to some embodiments. The system comprises two network nodes (NWN) 601 and 602. The network node 601 comprises an application server (APS) 620 (e.g., the application server 320). The network node 602 comprises an authorization server (AUS) 610 (e.g., one or more of the authorization servers 330, 440', 480', and 510).

FIG. 6 also illustrates three user devices (U1, U2, U3) 630, 640, 650 (compare with the requester 310, the user 410 and the actor 450). The user devices may request applications from the application server, leading to transmission of authorization request signals from the application server 620 to the authorization server 610, as exemplified above.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as an authorization server and/or a network node.

Embodiments may appear within an electronic apparatus (such as an authorization server and/or a network node) comprising arrangements, circuitry, and/or logic according to any of the embodiments described herein. Alternatively or additionally, an electronic apparatus (such as an authorization server and/or a network node) may be configured to perform methods according to any of the embodiments described herein.

Figure 7:
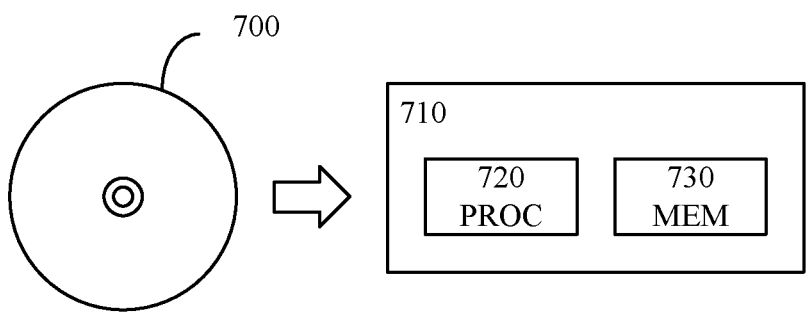
FIG. 7 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC; e.g., data processing circuitry or a data processing unit) 720, which may, for example, be comprised in an authorization server and/or a network node 710. When loaded into the data processor, the computer program may be stored in a memory (MEM) 730 associated with or comprised in the data processor. According to some embodiments, the computer program may, when loaded into and run by the data processor, cause execution of method steps according to, for example, any of the methods as illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples.

Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for authorization of resources clustered into one or more resource groups, the method comprising:
   clustering a plurality of functionally interdependent resources for authorization into one or more resource groups;
   storing a mapping between the functionally interdependent resources for authorization, wherein the mapping is in accordance with the clustering wherein the mapping indicates interdependencies and/or group membership;
   receiving an authorization request signal indicative of a first resource for authorization, wherein the authorization request signal is further indicative of a requester, wherein the first resource is one of the plurality of the functionally interdependent resources comprised in a first resource group,
   wherein each of the functionally interdependent resources is mandatory or optional for execution of a service, a functionality or an application,
   wherein the first resource group includes at least one mandatory resource in addition to the first resource;
   determining, for each mandatory resource of the first resource group, whether the resource is authorized; and
   transmitting a single authorization response signal, wherein:
   when all mandatory resources of the first resource group are determined as authorized, the authorization response signal is indicative of successful authorization of the first resource and further comprises an authorization token that contains at least an identification of the requester; or
   when the at least one mandatory resource of the first resource group is determined as unauthorized, the authorization response signal is indicative of unsuccessful authorization of the first resource.

2. The method of claim 1, wherein the first resource group comprises a plurality of hierarchically organized resources, wherein the first resource is a parent resource and the other resources of the first resource group are child resources, the child resources being functionally dependent on the parent resource.

3. The method of claim 1, wherein determining whether each mandatory resource is authorized comprises determining whether each mandatory resource is authorized for the requester.

4. The method of claim 1, wherein the authorization response signal is further indicative of which resources of the first resource group are determined as authorized.

5. A computer program product comprising a non-transitory computer readable medium, having thereon a computer program comprising program instructions, the computer program being loadable into a data processing unit and configured to cause execution of the method according to claim 1 when the computer program is run by the data processing unit.

6. An apparatus for authorization of resources clustered into one or more resource groups, the apparatus comprising controlling circuitry capable to execute a method to cause:
   clustering of a plurality of functionally interdependent resources for authorization into one or more resource groups;
   storing of a mapping between the functionally interdependent resources for authorization, wherein the mapping is in accordance with the clustering, wherein the mapping indicates interdependencies and/or group membership;
   reception of an authorization request signal indicative of a first resource for authorization, and wherein the authorization request signal is further indicative of a requester, wherein the first resource is one of the plurality of the functionally interdependent resources comprised in a first resource group,
   wherein each of the functionally interdependent resources is mandatory or optional for execution of a service, a functionality, or an application,
   wherein the first resource group includes at least one mandatory resource in addition to the first resource;
   determination, for each mandatory resource of the first resource group, of whether the resource is authorized; and
   transmission of a single authorization response signal, wherein:
   when all mandatory resources of the first resource group are determined as authorized, the authorization response signal is indicative of successful authorization of the first resource and further comprises an authorization token that contains at least an identification of the requester; or
   when the at least one mandatory resource of the first resource group is determined as unauthorized, the authorization response signal is indicative of unsuccessful authorization of the first resource.

7. The apparatus of claim 6, wherein the first resource group comprises a plurality of hierarchically organized resources, wherein the first resource is a parent resource and the other resources of the first resource group are child resources, the child resources being functionally dependent on the parent resource.

8. The apparatus of claim 6, wherein the controlling circuitry is configured to cause the determination of whether each mandatory resource is authorized comprises determining whether each mandatory resource is authorized for the requester.

9. The apparatus of claim 6, wherein the authorization response signal is further indicative of which resources of the first resource group are determined as authorized.

10. The apparatus of claim 6, wherein the apparatus is operational in an authorization server.

11. The apparatus of claim 10, wherein the authorization server is a network node of a wireless communication network.

* * * * *